Oct. 25, 1960 E. J. HALLENBECK 2,957,294
MOWER WITH INDEPENDENTLY MANIPULATED CUTTING HEAD
Filed Nov. 14, 1957 3 Sheets-Sheet 1
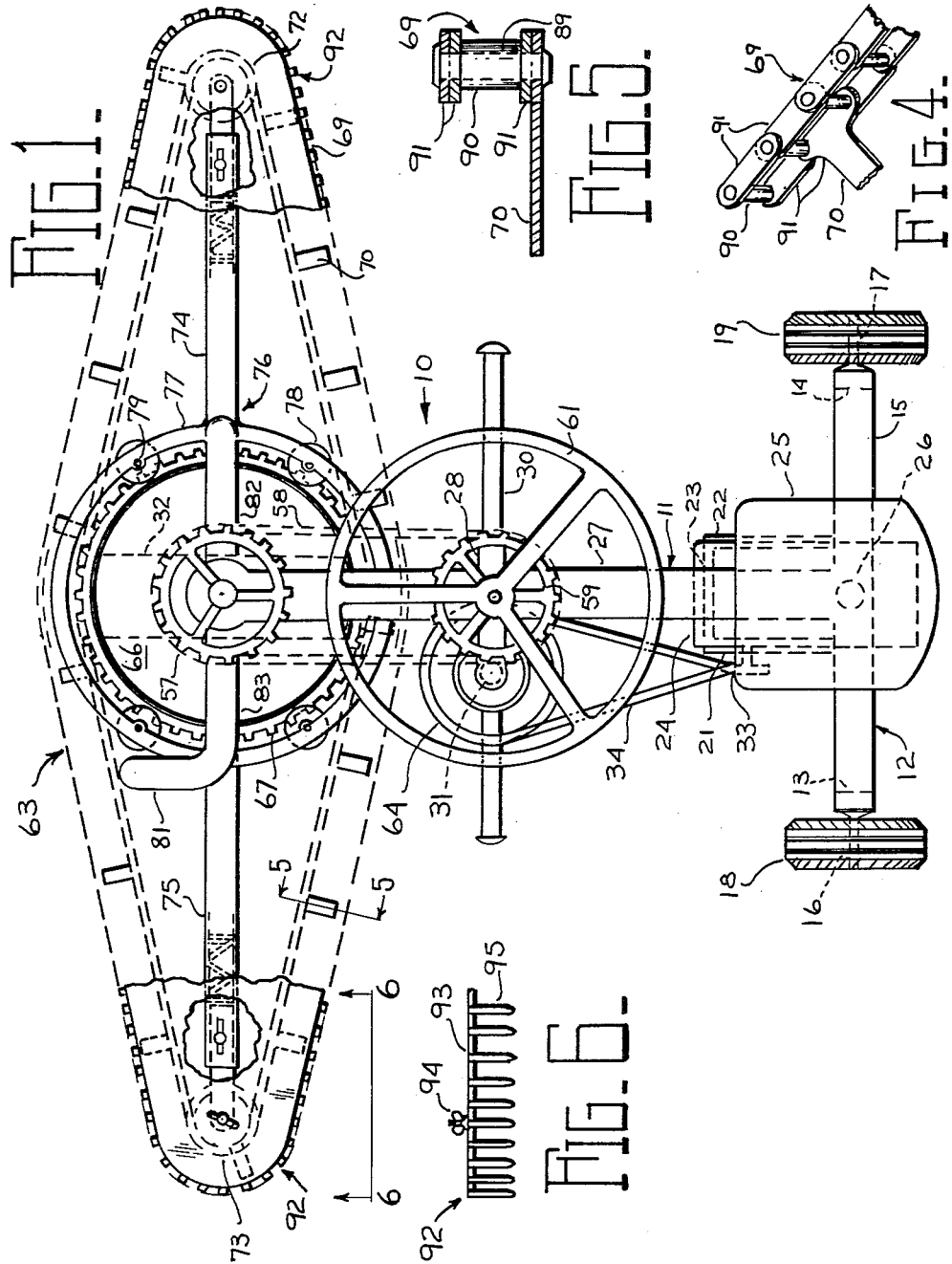
INVENTOR.
EMERSON J. HALLENBECK
BY Owen & Owen,
ATTORNEYS Oct. 25, 1960  E. J. HALLENBECK  2,957,294
MOWER WITH INDEPENDENTLY MANIPULATED CUTTING HEAD
Filed Nov. 14, 1957  3 Sheets-Sheet 2
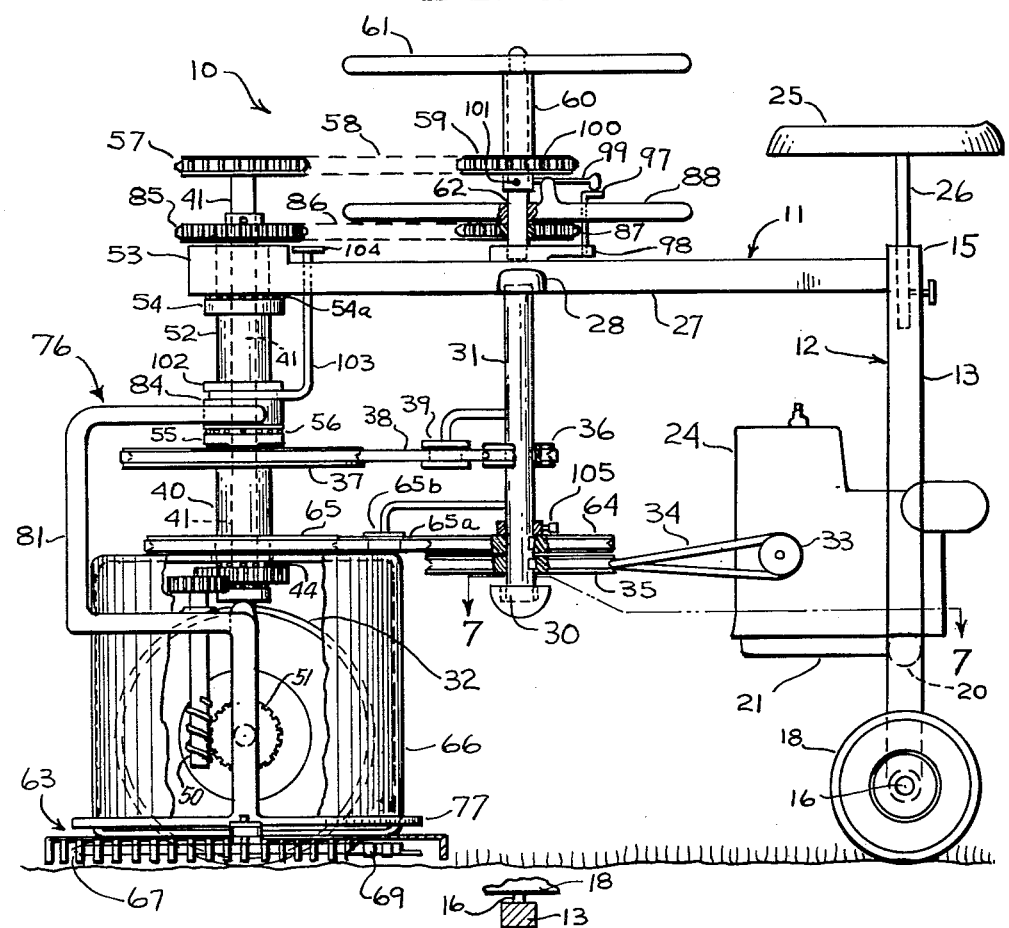
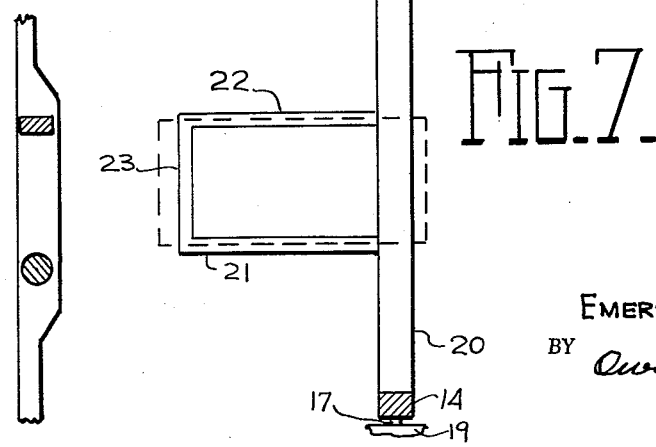
INVENTOR.
EMERSON J. HALLENBECK
BY Owen & Owen
ATTORNEYS

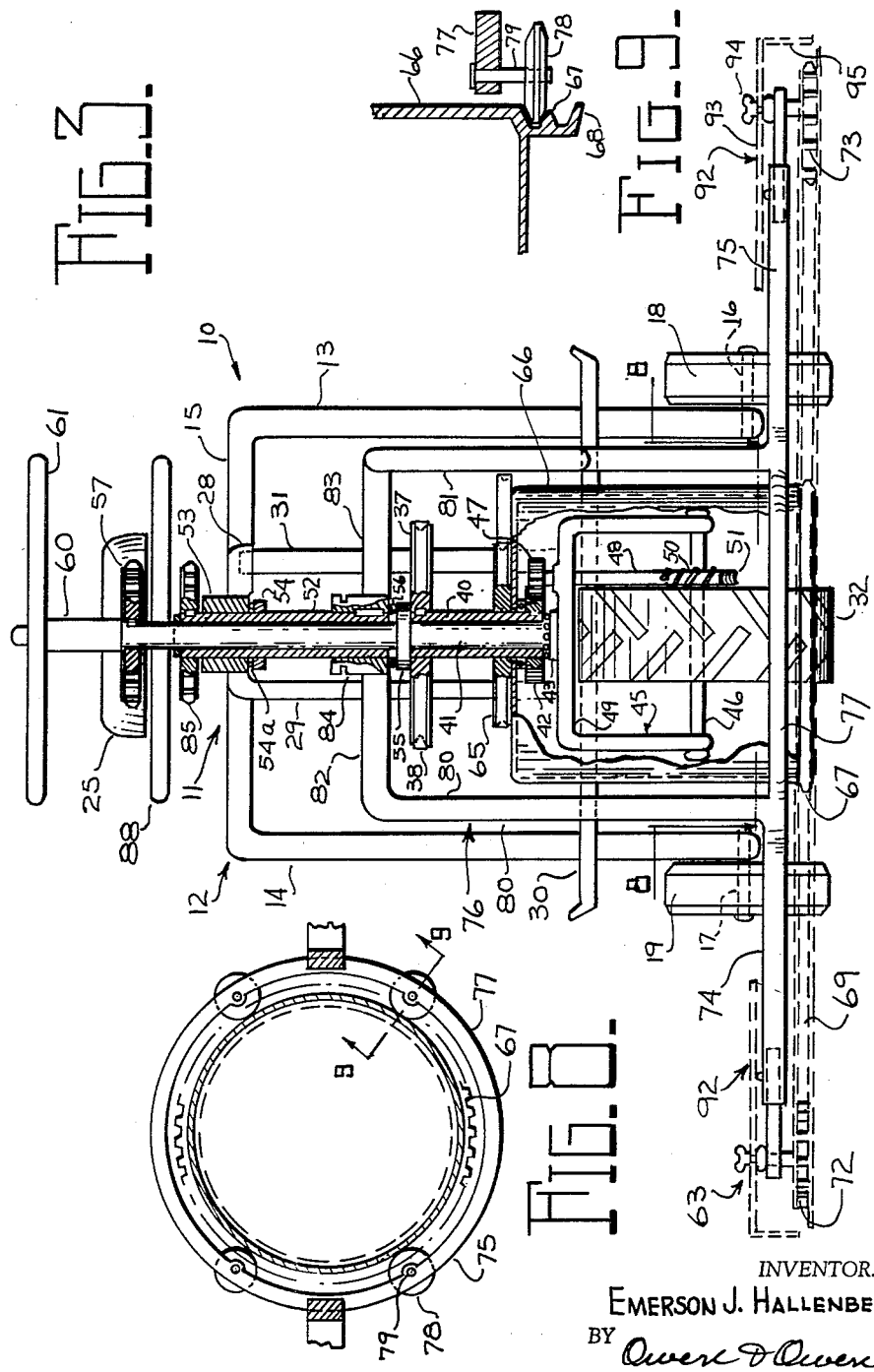

United States Patent Office 2,957,294
Patented Oct. 25, 1960

2,957,294

MOWER WITH INDEPENDENTLY MANIPULATED CUTTING HEAD

Emerson J. Hallenbeck, 2934 Shoreland Ave., Toledo, Ohio

Filed Nov. 14, 1957, Ser. No. 696,433

5 Claims. (Cl. 56—25.4)

This invention pertains to a mower with an elongated cutting head and more particularly to such a mower having means for adjusting the horizontal position of the elongated cutting head independently of the body of the mower and the path of the mower.

Mowers having elongated cutting heads are known in the art. Such cutting heads generally are in the form of blades mounted on an endless belt which travels in an elongated path, or in the form of blades mounted as a unit in a row which reciprocate adjacent a stationary row of similar blades. So far as is presently known, all of these mowers have cutting heads that are fixedly connected to the mower body in such a manner that they cannot be mainipulated independently of the body of the mower or of the path in which the mower travels.

Mowers with elongated cutting heads mounted in fixed positions are adequate for cutting grass or weeds in large, open fields since such mowers have a wide swath and can, therefore, cut large areas in a short period of time. These mowers, however, are not suited for use in areas having many obstructions, since the mowers are relatively clumsy and are difficult to operate when cutting grass around and between obstructions. With the advent of suburban living, many homes today have much larger yards than formerly, often an acre or more, and most of these yards, unlike fields, are interspersed with flower beds, trees, and lawn ornaments. Mowers which are suitable for use in fields are totally unsuitable for use in such yards, because of these obstructions.

The mower of the present invention overcomes the above difficulties by having an adjustable, elongated cutting head which covers a wide swath and thus enables the mower to cut large areas quickly, yet enables the mower to cut in areas between trees, flower beds, and the like. These advantages are attained by providing an elongated cutting head that can be manipulated independently of the mower body and also independently of the mower steering mechanism, so as to be independent of the path in which the mower travels.

A mower designed according to the teachings of the present invention can be driven through a single front wheel that enables the mower to achieve additional maneuverability. With this drive, the front wheel can be steered in a 360° circle that enables the mower to be reversed or driven in small radii, which cannot be done with conventional rear wheel drives.

It is, therefore, an object of the invention to provide a mower with an independently manipulated cutting head.

Another object of the invention is to provide a lawn mower that is driven through a single front wheel.

Still another object of the invention is to provide a mower with improved maneuverability.

A further object of the invention is to provide a mower that can cut grass in narrow spaces and large open areas with equal facility.

Other objects of the invention will be apparent from the following detailed description of a specific embodiment thereof, reference being made to the accompanying drawings, in which:

Fig. 1 is a plan view, with parts broken away, showing a mower embodying the principles of the invention.

Fig. 2 is a side view in elevation, with parts broken away, of the mower shown in Fig. 1.

Fig. 3 is a front view in elevation, with parts broken away, of the mower shown in Figs. 1 and 2.

Fig. 4 is a fragmentary view in perspective of a chain and cutting blade used with the mower of Figs. 1–3.

Fig. 5 is an enlarged view in cross section taken on line 5—5 in Fig. 1.

Fig. 6 is a detailed view of a portion of a cutter guard taken on line 6—6 in Fig. 1.

Fig. 7 is a plan view partially in cross section taken on line 7—7 in Fig. 2.

Fig. 8 is a plan view partially in cross section taken on line 8—8 in Fig. 3.

Fig. 9 is a view in cross section taken on line 9—9 in Fig. 8.

Various modifications will be apparent from the following description and drawings which illustrate the principles of the invention as embodied in a specific form of mower on which an operator can ride. The principles of the invention can also be employed in a walking-type, push or power mower.

The drive mechanism shown in the accompanying drawings includes sheaves, drive belts, gears, chains, and shafts that are drawn over-size in relation to other components of the mower to better illustrate the inter-relationship and operation of the functional mechanism.

A mower 10, as shown in Figs. 1–3, essentially comprises a three-wheel, motor-driven cart and an elongated cutting head. The mower 10 has a frame indicated at 11 which includes a U-shaped structure 12 consisting of two upright bars or tubes 13 and 14 and an upper connecting crossbar 15. The lower ends of the upright bars 13 and 14 carry axles 16 and 17 on which rear wheels 18 and 19 rotate. A lower crossbar 20 connects the lower portions of the upright bars 13 and 14 above the axles 16 and 17 and has branch rods 21, 22 and 23 (see also Fig. 7) forming a platform for a motor 24. A seat 25 has a supporting rod 26 adjustably held by the crossbar 15 to accommodate operators of many sizes. A main frame or supporting bar 27 is affixed to and projects forward from the center of the bar 15. Near the longitudinal center of the bar 27 is affixed a lateral bar 28 which has, at one end, a vertical bar 29 (Fig. 3) extending downwardly, the lower end of which is attached to a lower lateral bar 30. The bar 30 can serve as a foot rest for the operator and also serves as a support for the lower end of a countershaft 31 (Fig. 3), the upper end of which is journaled in the other end of the lateral bar 28. The shaft 31 can be journaled in suitable bearings in the lateral bars 28 and 30 to enable the shaft 31 to partially support the lower lateral bar 30. The countershaft 31 has sheaves for driving a front wheel and cutting head as will be hereinafter discussed.

The driving power for the mower 10 is attained through a front ground wheel 32. Although it would be easier to drive through one or both of the rear wheels 18 and 19, the front wheel drive has many advantages. The wheel 32 can be steered through a 360° circle and can be rotated 180° to a reverse direction to reverse the mower without the necessity of employing clutch mechanism. Further, with the front wheel drive, the mower 10 can be controlled to travel in any direction with respect to its longitudinal axis to give maximum control over the body of the mower and the position of the cutting head.

The mechanism employed for driving the front wheel 32 is best illustrated in Figs. 2 and 3. The motor 24 drives a sheave 33 operatively connected by a belt 34 to a power sheave 35 (Fig. 2) which is keyed to, and drives, the countershaft 31. An upper sheave 36 is keyed to the countershaft 31 to rotate therewith and drive a driven sheave 37 through V-belt 38 which is contacted by an idler pulley 39 to take up slack. The sheave 37 is attached to the upper end of a hollow connecting shaft 40, which is journaled around a main supporting shaft 41 and has a spur gear 42 keyed to its lower end. The assembly of the driven sheave 37, the shaft 40, and the spur gear 42 is supported by a collar 43 of the shaft 41 through a suitable thrust bearing 44. The shaft 41, in turn, is supported by a yoke 45 just below the collar 43, and this yoke has its arms rotatably attached to an axle 46 of the front wheel 32. The spur gear 42 is meshed with a driven spur gear 47 (Fig. 3) which transmits power through a shaft 48 journaled in a cross-arm 49 of the yoke 45 to a worm 50 which drives a worm wheel 51, suitably concentrically attached to the hub of the wheel 32.

In operation, the motor sheave 33 drives the power sheave 35 and the countershaft 31, thus driving the sheave 36. The sheave 36 drives the driven sheave 37 and the hollow shaft 40 with the spur-gear 42 connected thereto. The spur-gear 42 drives the gear 47 and the worm 50, which drives the worm wheel 51 and, hence, drives the front wheel 32. With the particular driving arrangement shown, the front wheel 32 can be freely rotated 360° with no obstruction. The spur-gear 47 remains a constant distance from the shaft 41 and is always meshed with the spur-gear 42 regardless of the position of the wheel 32. Also, the worm 50 is always in the same relative position with respect to the worm wheel 51 since the position of the worm 50 is determined by the position of the cross-arm 49 in which the shaft 48 is journaled. The wheel 32 can thus pull or push the mower 10 in any direction.

The position of the wheel 32 is controlled by steering mechanism independent of the drive mechanism. The yoke 45 is rotated by the shaft 41 which extends through the hollow shaft 40 and a hollow shaft 52 (see Fig. 3 particularly). The shaft 52 extends through a bearing part 53 at the forward end of the main supporting bar 27 and has a flange or collar 54 near its upper end which bears upward against the lower surface of the bearing part 53 through a suitable thrust bearing 54a. The shaft 41 has a similar flange or collar 55 near its central portion which bears against the lower end of the hollow shaft 52 through a thrust bearing 56. The shaft 41 thus indirectly supports the main frame bar 27 through the flange 55, the hollow shaft 52, and the flange 54. The upper end of the supporting shaft 41, above the bearing block 53, has a sprocket 57 keyed thereto and driven through a chain 58 by a drive sprocket 59 attached to a hollow hub 60 of an upper steering wheel 61. The steering wheel 61 is rotatably supported on an axle 62 (Fig. 2) which is attached to the frame or supporting bar 27. When the steering wheel 61 is turned by the operator, it turns the sprocket 59 and, hence, the sprocket 57. The sprocket 57 turns the shaft 41 and the yoke 45 which turns the wheel 32 through the axle 46. It will be readily seen that the steering mechanism is also free to rotate 360°, as is the drive wheel 32.

The operation of a cutting head indicated at 63 will now be described. When the countershaft 31 is rotated by means of the motor 24, it drives a second sheave 64 (Fig. 2) attached thereto. The sheave 64 drives a sheave 65 through a belt 65a contacted by a tension sheave 65b. The sheave 65 is concentrically attached to a large power-transmitting cylinder 66. A large annular spur-gear 67 (see Figs. 1, 3, 8 and 9) is attached to the cylinder 66 at its lower end through a reinforcing ring 68. An endless cutter chain 69, carrying a multiplicity of blades 70 meshes with the gear 67 at diametrically opposite sides and is guided at the extremities of a generally diamond-shape path by idler spur-gears 72 and 73 (Figs. 1 and 3). In operation, the sheave 64 drives the sheave 65 and the power cylinder 66 with its large annular spur-gear 67. The chain 69 is driven by the spur-gear 67 in its elongated diamond-shape path.

The cutting head 63 can be manipulated so that the longitudinal axis of the path of the chain 69 can be in any position between positions perpendicular and parallel to the longitudinal extent of the mower body. For this purpose, the spur-gears 72 and 73 are supported by horizontally extending, adjustable arms 74 and 75 of a tubular structure or supporting frame generally indicated at 76 (Figs. 1, 2 and 3). The arms 74 and 75 are connected to a tubular ring 77 at the lower end of the frame 76 and this ring has a plurality of guide rollers 78 (Figs. 8 and 9) on stub shafts 79 attached to the ring 77. The rollers 78 contact the reinforcing ring 68 to guide and give lateral stability to the cylinder 66 and its spur-gear 67. The arms 74 and 75 and the tubular ring 77 are supported in a horizontal plane by upright members 80 and 81 of the frame structure 76. The upright member 81 has an offset portion designed to circumvent the sheaves 34, 35 and 36. The members 80 and 81 can thus be rotated, along with the path of the chain 69, 90° in either direction.

Horizontal arms 82 and 83 are affixed to a grooved collar 84 which is keyed to the annular shaft 52 for vertical but non-rotational movement with respect thereto (Figs. 2 and 3). The collar 84 is supported, when in its lowest position, on the bearing 56 and the flange 55. The upper end of the annular shaft 52, which extends through the part 53 of the main supporting arm 27, is attached to a sprocket 85, which is operatively connected through a chain 86 to a drive sprocket 87. The sprocket 87 is connected to the hub of a lower steering wheel 88 which is rotatably supported by the shaft 62. The steering wheel 88 turns the sprocket 87 and the sprocket 85. The latter turns the attached tubular shaft 52 and the collar 84 keyed thereto. The arms 82 and 83, the upright members 80 and 81, the tubular ring 77, and the adjustable arms 74 and 75 are turned as a unit to thereby direct the path of the cutter chain 69.

The chain 69 and the blades 70 are shown in greater detail in Figs. 4 and 5. The chain 69 comprises a multiplicity of connecting shafts 89, spacing tubes 90, and connecting links 91. At spaced intervals, one of the cutting blades 70 is integrally formed with a connecting link 91. With this arrangement, the cutters can be removed for replacement or sharpening. Many alternate chain or flexible belt arrangements are possible, however, and it is not intended to limit the invention to the particular form shown.

A suitable guard indicated at 92 (see also Fig. 6) can be placed around the blades 70 and the chain 69. In the embodiment shown, a metal sheet 93 is disposed in a horizontal plane and is suitably attached, as by wing-nuts 94 (Fig. 3), to the upper surfaces of the arms 74 and 75. The outer edge of the sheet 93 is contoured to the path of the chain 69 but is larger in area so as to extend beyond the blades 70. A multiplicity of teeth 95 depend from the edges of the sheet 93 to give protection from the blades 70. The teeth 95 can be an integral part of the sheet 93 and simply bent downwardly after the sheet 93 is cut out of suitable stock.

If desired, as in open field work, the cutting head 63 can be maintained in a fixed position with respect to the body of the mower 10 by passing a pin 97 (Fig. 2) through the steering wheel 88 and through a projection 98 of the main supporting bar 27. This prevents the steering wheel 88 from turning and, hence, the tubular structure 76 from turning. The path of the chain 69 is thus maintained in a fixed relationship with respect to the body of the mower 10. If desired, the wheel 32 and the cutting head 63 can be turned as a unit with the cutting head 63 at right angles to the path of the mower 10. This can be accomplished by extending a pin 99 (Fig. 2) through a projection 100 on the wheel 88 and into one of a plurality of holes 101 in the hub 60 of the steering wheel 61. The lower steering wheel 88 will then be turned as the upper steering wheel 61 is turned to cause cutting head 63 to turn in unison with the wheel 32.

The cutting head 63 can also be raised or lowered to adjust the cutting height. For this purpose, the collar 84 has a groove 102 in which a lower end of a rod 103 (Fig. 2) is engaged. The rod 103 extends upwardly through the supporting bar 27 and has a hand nut 104 which can be adjusted to raise and lower the rod 103. The raising or lowering of this rod raises or lowers the collar 84 and, hence, the structure 76 and the cutter chain 69. The ring 77 and its rollers 78 are also raised or lowered and this raises or lowers the cylinder 66, the ring 68 at its bottom, the spur-gear 67, and the sheave 65. The drive sheave 64 is separately raised or lowered on the countershaft 31 by means of a set screw 105 to properly align the sheave 64 with the sheave 65.

I wish it understood that my invention is not limited to any specific construction, arrangement or form of the parts, as it is capable of numerous modifications and changes without departing from the spirit of the claims.

I claim:

1. In a mower comprising a frame, a ground wheel having an axle, a yoke mounted on said axle, a supporting shaft attached to said yoke and extending away from said wheel, said shaft being journaled in said frame, and means connected to said shaft for turning said shaft to turn said yoke and said wheel relative to the frame, the improvement comprising a cutting blade chain, means for supporting said chain in a generally elongated, horizontal path around said wheel, said supporting means being movably engaged with said shaft, means operatively connected to said chain for moving said chain along said path, and means operatively associated with said supporting means for turning said supporting means for changing the horizontal direction of said path independently of said wheel and frame.

2. In a mower comprising a frame, a wheel having an axle, a yoke mounted on said axle, a supporting shaft attached to said yoke and extending away from said wheel, said shaft being journaled in said frame, and means connected to said shaft for turning said supporting shaft to turn said yoke and said wheel, the improvement comprising a chain of cutting blades, a hollow shaft disposed around a portion of said supporting shaft, means for supporting said blade chain in a generally elongated, horizontal path around said wheel, said supporting means being connected to said hollow shaft, means connected to said supporting shaft for holding said hollow shaft in a predetermined vertical position on said supporting shaft, means operatively connected to said blades for moving said blades along said path, and means connected to said hollow shaft for turning said hollow shaft independently of said supporting shaft for changing the horizontal direction of said path independently of said wheel.

3. Apparatus according to claim 2 characterized by said means for supporting said blade chain on said hollow shaft being axially movable on the shaft to vertically move said blade chain and change the distance said blades are disposed above the ground.

4. A mower comprising a main frame, a ground wheel rotatably held by said main frame, a plurality of cutting blades, means connected to said blades for holding said blades in spaced relationship, a supporting frame rotatably mounted on said main frame for supporting said connecting means in a horizontal plane at a fixed distance above the ground and in an elongated path, means operatively connected to said connecting means for driving said connecting means and said blades in the horizontal path, and means connected to said supporting frame and manipulated by a mower operator to turn said supporting frame to change the position of the elongated path of said blades independently of said main frame and said ground wheel.

5. A mower comprising a main frame, a ground wheel rotatably held by said frame, a plurality of cutting blades, an endless chain connected to said blades for holding said blades in spaced relationship, a supporting frame rotatably mounted on said main frame for supporting said chain in a horizontal plane at a fixed distance above the ground and in an elongated path, means operatively connected to said chain for driving said chain and said blades in the horizontal path, and means connected to said supporting frame and manipulated by a mower operator to turn said supporting frame to change the direction of the path of said blades independently of the position of said main frame and said ground wheel.

References Cited in the file of this patent

UNITED STATES PATENTS

| | | |
|---|---|---|
| 1,103,678 | Marsh | June 3, 1914 |
| 1,559,429 | Hirai | Oct. 27, 1925 |
| 2,421,558 | Goldsmith | June 3, 1947 |
| 2,451,589 | Thomas | Oct. 19, 1948 |
| 2,728,181 | Carpenter | Dec. 27, 1955 |
| 2,764,899 | West | Oct. 2, 1956 |
| 2,765,861 | Ekas | Oct. 9, 1956 |
| 2,791,081 | Allen et al. | May 7, 1957 |
| 2,860,474 | Cyr | Nov. 18, 1958 |

FOREIGN PATENTS

| | | |
|---|---|---|
| 744,916 | Great Britain | Feb. 15, 1956 |